US011322046B2

(12) United States Patent
Kim

(10) Patent No.: US 11,322,046 B2
(45) Date of Patent: May 3, 2022

(54) METHOD FOR MANAGING LANGUAGE SPEAKING LESSON ON NETWORK AND MANAGEMENT SERVER USED THEREFOR

(71) Applicants: YANADOO, Seoul (KR); Min Chul Kim, Seoul (KR)

(72) Inventor: Min Chul Kim, Seoul (KR)

(73) Assignees: Min Chul Kim, Seoul (KR); YANADOO, Seoul (KR)

( * ) Notice: Subject to any disclaimer, the term of this patent is extended or adjusted under 35 U.S.C. 154(b) by 0 days.

(21) Appl. No.: 16/962,295

(22) PCT Filed: Nov. 21, 2018

(86) PCT No.: PCT/KR2018/014341
§ 371 (c)(1),
(2) Date: Aug. 17, 2020

(87) PCT Pub. No.: WO2019/139248
PCT Pub. Date: Jul. 18, 2019

(65) Prior Publication Data
US 2021/0074179 A1    Mar. 11, 2021

(30) Foreign Application Priority Data
Jan. 15, 2018 (KR) .......................... 10-2018-0004971

(51) Int. Cl.
*G09B 19/06* (2006.01)
*G06Q 50/20* (2012.01)

(52) U.S. Cl.
CPC ............. *G09B 19/06* (2013.01); *G06Q 50/20* (2013.01)

(58) Field of Classification Search
None
See application file for complete search history.

(56) References Cited

U.S. PATENT DOCUMENTS 3,744,156 A * 7/1973 Ottassi ..................... G09B 5/06
434/308
6,302,695 B1 * 10/2001 Rtischev ............... G09B 19/08
434/156

(Continued)

FOREIGN PATENT DOCUMENTS

AU      2007201394 A1 * 10/2007
KR      10-2002-0053965 A     7/2002

(Continued)

*Primary Examiner* — William D Ermlick
(74) *Attorney, Agent, or Firm* — Novick, Kim & Lee, PLLC; Jae Youn Kim; Jihun Kim

(57) ABSTRACT

A method for managing a language speaking lesson on a network is implemented through the steps of: receiving, by a management server, a request for registering a voice recording task of a learner from an instructor terminal; receiving, by the management server, voice recording data from a terminal of a learner who has confirmed the voice recording task; and receiving, by the management server, recording data for pronunciation correction of the voice recording data from the instructor terminal. By this method, the learner may be sufficiently given an opportunity to practice speaking a foreign language in a course of performing the voice recording task. In addition, the learner may repeatedly listen to the recording data for pronunciation correction directly recorded by the instructor for his or her foreign language pronunciation.

4 Claims, 5 Drawing Sheets

(56) References Cited

U.S. PATENT DOCUMENTS

| | | | | |
|---|---|---|---|---|
| 6,705,869 B2* | 3/2004 | Schwartz | .......... | H04L 29/06027 434/219 |
| 7,657,221 B2* | 2/2010 | Dittrich | .................... | G09B 5/06 434/353 |
| 7,912,900 B1* | 3/2011 | Lippert | .................. | G06Q 50/20 709/204 |
| 8,109,765 B2* | 2/2012 | Beattie | ..................... | G09B 5/04 434/178 |
| 8,342,854 B2* | 1/2013 | Parmer | .................... | G09B 7/00 434/323 |
| 2002/0086274 A1* | 7/2002 | Chen | ........................ | G09B 7/04 434/322 |
| 2002/0115044 A1* | 8/2002 | Shpiro | ..................... | G09B 5/06 434/156 |
| 2003/0207244 A1* | 11/2003 | Sakai | ........................ | G09B 7/02 434/350 |
| 2004/0203408 A1* | 10/2004 | Wen | ........................ | H04W 4/02 455/66.1 |
| 2005/0272023 A1* | 12/2005 | Takano | .................. | G06Q 30/06 434/350 |
| 2006/0004567 A1* | 1/2006 | Russell | .................... | G09B 19/06 704/209 |
| 2006/0035205 A1* | 2/2006 | Dobson | .................... | G07C 9/28 434/350 |
| 2006/0194184 A1* | 8/2006 | Wagner | .................. | G09B 19/06 434/350 |
| 2007/0255570 A1* | 11/2007 | Annaz | .................... | G09B 19/06 704/270 |
| 2008/0027731 A1* | 1/2008 | Shpiro | .................. | G09B 19/06 704/276 |
| 2008/0293020 A1* | 11/2008 | Jang | ........................ | G09B 19/06 434/157 |
| 2010/0047748 A1* | 2/2010 | Hwang | ..................... | G09B 5/04 434/157 |
| 2011/0059422 A1* | 3/2011 | Masaoka | ................. | G09B 19/06 434/157 |
| 2011/0059423 A1* | 3/2011 | Kadar | ...................... | G09B 7/02 434/185 |
| 2011/0102142 A1* | 5/2011 | Widger | .................... | H04N 7/18 340/5.83 |
| 2012/0276504 A1* | 11/2012 | Chen | ....................... | G09B 5/067 434/157 |
| 2013/0266923 A1* | 10/2013 | Lee | .......................... | G09B 5/08 434/351 |
| 2014/0212866 A1* | 7/2014 | Cho | ......................... | G09B 5/08 434/362 |
| 2014/0278421 A1* | 9/2014 | Komissarchik | ......... | G10L 15/26 704/251 |
| 2015/0134338 A1* | 5/2015 | Jung | ...................... | G09B 19/06 704/260 |
| 2015/0243178 A1* | 8/2015 | Tuyl | ......................... | G09B 5/02 434/350 |
| 2016/0275804 A1* | 9/2016 | Koppel | ..................... | G09B 5/02 |
| 2017/0228746 A1* | 8/2017 | Morita | ............... | G06Q 30/0203 |
| 2018/0096624 A1* | 4/2018 | Ward | .................... | G06Q 50/205 |
| 2018/0197431 A1* | 7/2018 | Davis | ........................ | G09B 5/00 |
| 2018/0197432 A1* | 7/2018 | Davis | .................. | G06F 3/04842 |
| 2019/0311642 A1* | 10/2019 | Kulshrestha | .......... | G06F 16/176 |

FOREIGN PATENT DOCUMENTS

| | | |
|---|---|---|
| KR | 10-0788781 B1 | 12/2007 |
| KR | 10-2010-0031245 A | 3/2010 |
| KR | 10-2013-0012899 A | 2/2013 |
| KR | 10-2014-0004541 A | 1/2014 |

* cited by examiner

Voice Comment Task

Please record the following sentences as voice comments.

1. I enjoy running.
2. I enjoy running for an hour on Sundays.
3. I want to study.
4. I want to study English after dinner.
5. I want to take pictures.
6. I want to take pictures with my friends every day.

METHOD FOR MANAGING LANGUAGE SPEAKING LESSON ON NETWORK AND MANAGEMENT SERVER USED THEREFOR

TECHNICAL FIELD

The present invention relates to a method for managing a language speaking lesson on a network and a management server used therefor, and more specifically, to a method for managing a language speaking lesson on a network and a management server used therefor, in which a learner may be sufficiently given an opportunity to practice speaking a foreign language in a process of performing a voice recording task, and not only may repeatedly listen to recording data for pronunciation correction directly recorded by an instructor for his or her foreign language pronunciation, but also may listen to foreign language pronunciations of other learners for the same sentence, such that the learner can be motivated to learn to speak the foreign language.

BACKGROUND ART

As a demand for foreign language learning through online is increased, various types of online services for foreign language learning are provided.

Meanwhile, most of the online services provided for practicing foreign language speaking are performed by relaying a native speaking instructor with learners through a network.

Therefore, the learners should bear time constraints of having to access the network at a fixed time in order to come face to face with the native speaking instructor online at the appointed time.

In addition, since speaking practice through a video call with the native speaking instructor is smoothly performed only when the learner listens to the native speaking instructor's voice, there is a problem that learners who lack foreign language listening skills are not sufficiently given opportunities for speaking practice.

SUMMARY OF INVENTION

Problems to be Solved by Invention

Accordingly, it is an object of the present invention to provide a method for managing a language speaking lesson on a network and a management server used therefor, in which a learner may be sufficiently given an opportunity to practice speaking a foreign language in a process of performing a voice recording task, and not only may repeatedly listen to recording data for pronunciation correction directly recorded by an instructor for his or her foreign language pronunciation, but also may listen to foreign language pronunciations of other learners for the same sentence, such that the learner can be motivated to learn to speak the foreign language.

Means for Solving Problems

To achieve the above-described object, according to an aspect of the present invention, there is provided a method for managing a language speaking lesson on a network including: (a) receiving, by a management server, a request for registering a voice recording task of a learner from an instructor terminal; (b) receiving, by the management server, voice recording data from a terminal of a learner who has confirmed the voice recording task; and (c) receiving, by the management server, recording data for pronunciation correction of the voice recording data from the instructor terminal.

Preferably, the method may further include, after the step (a) and before the step (b), determining, by the management server, whether the learner attends a class based on device identifier reception time information from the learner terminal.

In addition, the method may further include (d) receiving, by the management server, a tag request for a learner who has not performed the voice recording task from the learner terminal.

Further, the method may further include (d) receiving, by the management server, grade information on other learners who have performed the voice recording task from the learner terminals.

Meanwhile, according to another aspect of the present invention, there is provided a management server including: a storage unit configured to store a request for registering a voice recording task of a learner received from an instructor terminal; and a reception unit configured to receive voice recording data from a terminal of a learner who has confirmed the voice recording task registered in the storage unit, wherein the reception unit further receives recording data for pronunciation correction of the voice recording data from the instructor terminal.

Preferably, the management server further includes a determination unit configured to determine whether the learner attends a class based on device identifier reception time information from the learner terminal.

In addition, the reception unit may further receive a tag request for a learner who has not performed the voice recording task from the learner terminal.

Furthermore, the reception unit may further receive grade information on other learners who have performed the voice recording task from the learner terminals.

Advantageous Effects

According to the present invention, the learner may be sufficiently given an opportunity to practice speaking a foreign language in a course of performing the voice recording task.

In addition, according to the present invention, the learner may repeatedly listen to the recording data for pronunciation correction directly recorded by the instructor for his or her foreign language pronunciation.

Further, according to the present invention, the learner may listen to foreign language pronunciations of other learners for the same sentence, such that the learner can be motivated to learn to speak the foreign language.

BRIEF DESCRIPTION OF DRAWINGS

FIGS. 4 to 6 are diagrams illustrating information displayed on a screen of a learner terminal in accordance with the execution of the method for managing a language speaking lesson on a network according to the embodiment of the present invention.

MODE FOR CARRYING OUT INVENTION

Figure 1:
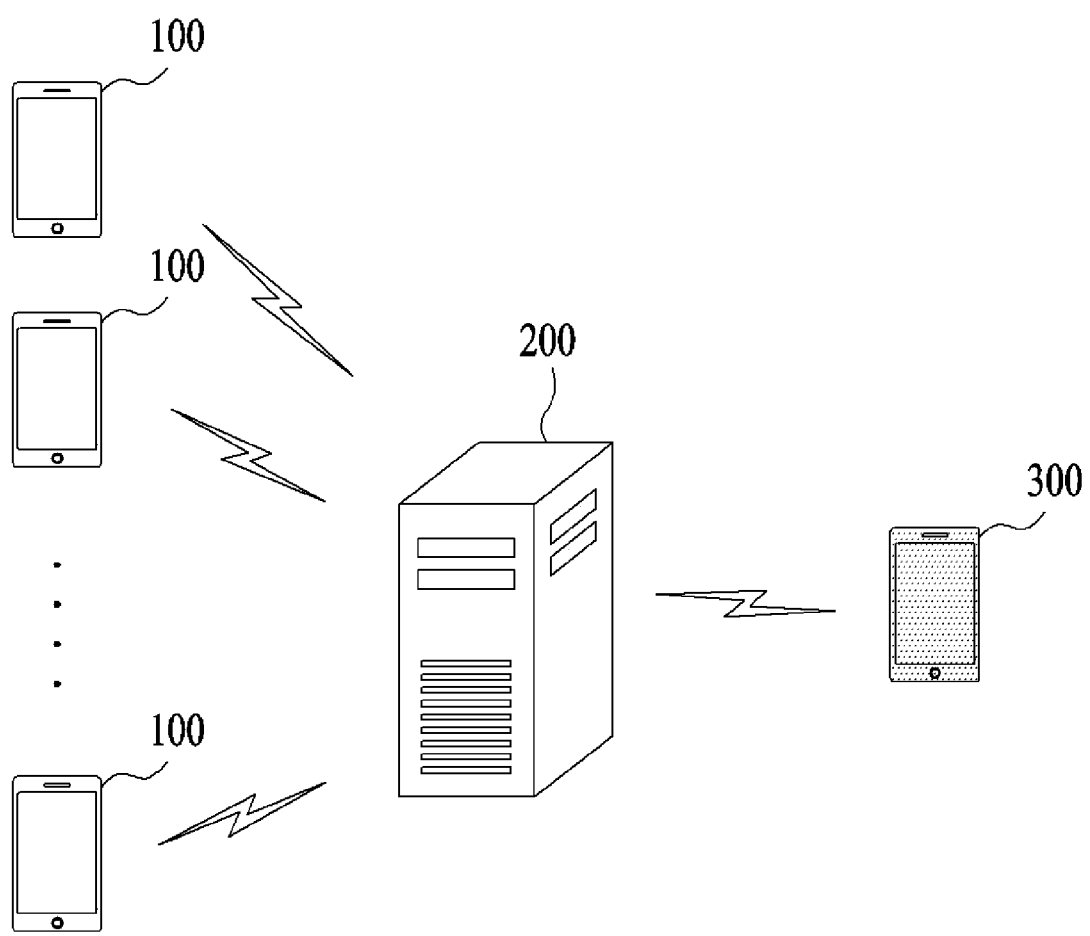
FIG. 1 is a block diagram of a system for managing a language speaking lesson on a network according to an embodiment of the present invention.

Hereinafter, the present invention will be described with reference to the accompanying drawings in detail. Referring to the drawings, wherein like reference characters designate like or corresponding parts throughout the several views. In the embodiments of the present invention, the publicly known functions and configurations that are judged to be able to make the purport of the present invention unnecessarily obscure will not be described.

FIG. 1 is a block diagram of a system for managing a language speaking lesson on a network according to an embodiment of the present invention. Referring to FIG. 1, the system for managing a language speaking lesson on a network according to the embodiment of the present invention includes a plurality of learner terminals 100, a management server 200, and an instructor terminal 300.

The learner terminal 100 is a communication terminal such as a smart phone or PC owned by a learner who learns foreign language speaking through a method for managing a language speaking lesson on a network according to the present invention, and the instructor terminal 300 is a communication terminal such as a smartphone and a PC owned by an instructor who teaches foreign language speaking learning through the method for managing a language speaking lesson on a network according to the present invention.

The management server 200 is a server installed and operated by a business operator who provides a service for managing a language speaking lesson on a network according to the present invention. The management server 200 receives a request for registering a voice recording task of the learner from the instructor terminal 300, stores and registers the received voice recording task, and then accesses the management server 200 to receive voice recording data from a learner terminal 100 of a learner who has confirmed the voice recording task, followed by storing and registering the same.

Figure 2:
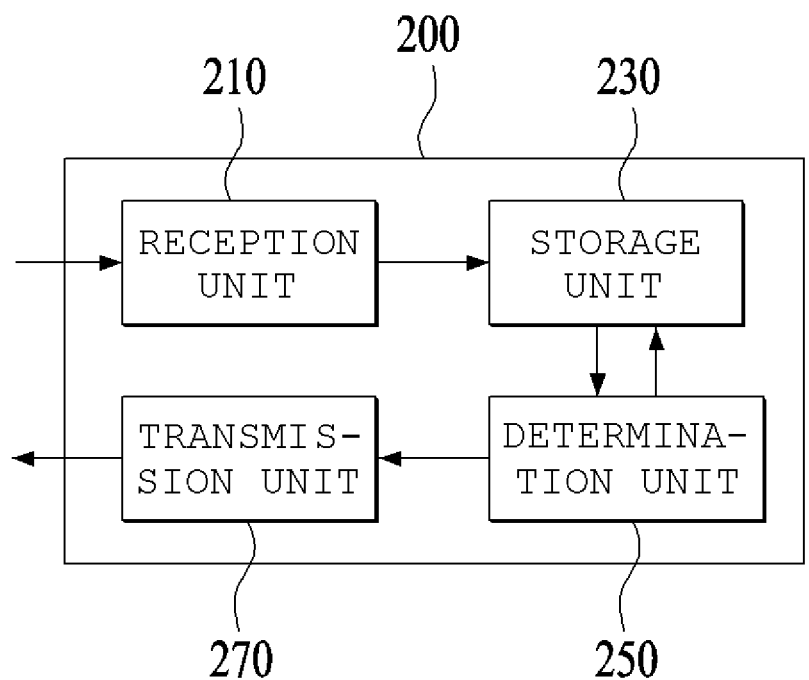
FIG. 2 is a functional block diagram illustrating a structure of a management server in the system for managing a language speaking lesson on a network according to the embodiment of the present invention.

FIG. 2 is a functional block diagram illustrating a structure of the management server 200 in the system for managing a language speaking lesson on a network according to the embodiment of the present invention. Referring to FIG. 2, the management server 200 in the system for managing a language speaking lesson on a network according to the embodiment of the present invention includes a reception unit 210, a storage unit 230, a determination unit 250, and a transmission unit 270.

The reception unit 210 of the management server 200 receives a course request from the learner terminal 100, the request for registering a voice recording task from the instructor terminal 300, the voice recording data from the learner terminal 100, recording data for pronunciation correction of the learner from the instructor terminal 300 and the like. The storage unit 230 stores various data received from the learner terminal 100 and the instructor terminal 300 as described above.

Meanwhile, the determination unit 250 of the management server 200 organizes classes for a speaking lesson according to course requests from a plurality of learners, selects an instructor for each class, and confirms whether the learner attends the class based on access time information to the management server 200 of the learner terminal 100, determines whether a reward to the learner is performed based on the grade information on the voice recording of the learner by the instructor or other learners, attendance information of the learner, information on performing a subtask such as a tag request of the learner for other learners, and the like, as well as determines whether the learner completes the class course based on the attendance information of the learner and the grade information on the voice recording of the learner.

In addition, the transmission unit 270 of the management server 200 transmits class time information to the learner terminal 100, transmits a reward guide message determined for the learner to the learner terminal 100, and transmits a course guide message according to the determination whether the class course of the learner is completed to the learner terminal 100.

Figure 3:
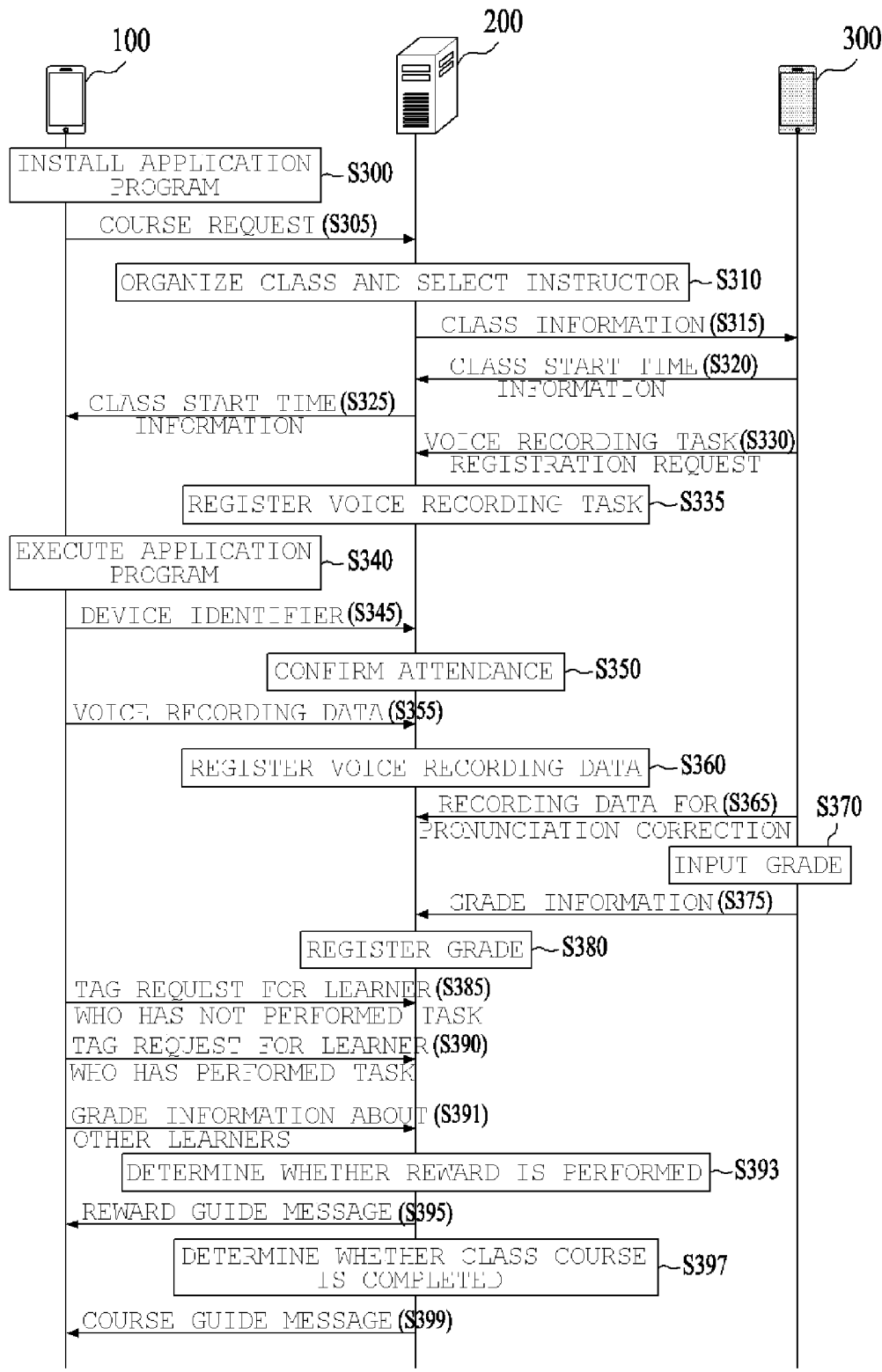
FIG. 3 is a flow chart of signals for describing an execution process of a method for managing a language speaking lesson on a network according to an embodiment of the present invention.

FIG. 3 is a flow chart of signals for describing an execution process of a method for managing a language speaking lesson on a network according to an embodiment of the present invention. Hereinafter, the execution process of the method for managing a language speaking lesson on a network according to the embodiment of the present invention will be described with reference to FIGS. 1 to 6.

First, the learner installs an application program utilized to use the service for managing a language speaking lesson on a network according to the present invention in the learner terminal 100 (S300).

Then, when executing the application program by the learner, a device identifier such as an international mobile equipment identity number (IMEI) value of the learner terminal 100 is transmitted to the management server 200 from the learner terminal, and the management server 200 stores the device identifier received from the learner terminal 100 in the storage unit 230.

Thereafter, the learner enters his or her ID and password to complete the service membership registration, and then enters course information for the language speaking lesson desired to be taken by the learner.

Meanwhile, in implementing the present invention, the course information input by the learner through the learner terminal 100 includes service ID information of the learner, course level information of the class (for example, a beginner course: level 1) desired to be taken by the learner, and time zone information on the desired class (for example, 12:00-13:00), and ID information of other learners who wish to attend the class together.

When the above-described course information is input through the learner terminal 100, the learner terminal 100 transmits a course request including the course information to the management server 200 (S305).

The course information included in the course request received from the learner terminal 100 by the reception unit 210 of the management server 200 is stored in the storage unit 230 together with the device identifier in the above-described step S300.

As described above, a plurality of course requests received from the plurality of learner terminals 100 are stored in the storage unit 230 of the management server 200, and the determination unit 250 of the management server 200 organizes classes based on the course information included in the individual course requests of the plurality of learners, then selects an instructor for each class (S310).

Specifically, in implementing the above-described step S310, the determination unit 250 of the management server 200 may organize the classes by selecting learners who have transmitted the course requests in which time zone information on the desired class is common among the course information included in each of the plurality of course requests.

In addition, the determination unit 250 of the management server 200 may also organize the classes by selecting learners who have transmitted the course requests in which class course level information is common among the course information included in each of the plurality of course requests.

Further, the determination unit 250 of the management server 200 may also organize the classes by selecting learners who have transmitted the course requests in which both the time zone information on the desired class and the class course level information are common among the course information included in each of the plurality of course requests. Then, other learners who wish to take the class together may also be included in the class organized as described above by the learner included in the class through the course request.

In addition, the determination unit 250 of the management server 200 may select an instructor to be in charge of the class based on the class information organized as described above. To this end, it is preferable that instructor information (ID, time zone information on the desired lecture, etc.) of various instructors is stored in the storage unit 230 of the management server 200. Specifically, an application program utilized to use the service for managing a language speaking lesson on a network according to the present invention is installed in the instructor terminal 300, which is a communication terminal possessed by the instructor. When the instructor executes the application program and then inputs his or her information, the management server 200 receives and stores the instructor information from the instructor terminal 300.

Meanwhile, the determination unit 250 of the management server 200 may select, as an instructor of the class, an instructor in which the time zone information on the desired lecture in the same time zone is recorded when organizing the class based on the time zone information on the desired class as described above.

Thereafter, the transmission unit 270 of the management server 200 transmits the class information matched with the instructor to the instructor terminal 300 possessed by the instructor based on the selected ID information of the instructor (S315).

Meanwhile, in implementing the present invention, the class information transmitted to the instructor terminal 300 in the above-described step S315 may include ID information of each learner organizing the class, course level information of the desired class, time zone information on the desired class, and may also further include average time zone information on the desired class time zone of the learners organizing the class, calculated by the determination unit 250 of the management server 200.

Meanwhile, the instructor who received the class information from the management server 200 in the above-described step S315 determines a class start time (e.g., 13:10 every Monday) with reference to the time zone information on the desired class of each learner included in the class information or the average time zone information on the desired class time zone of the plurality of learners organizing the class.

When inputting the class start time information determined as described above by the instructor through the instructor terminal 300, the management server 200 receives and stores the class start time information from the instructor terminal 300 (S320), and transmits the class start time information to the terminals 100 of the learners organizing the class matched with the instructor (S325).

Figure 4:

Thereafter, when inputting the voice recording task as shown in FIG. 4 by the instructor through the instructor terminal 300 at the appointed time of class start, the management server 200 receives a voice recording registration request including voice recording task information input by the instructor from the instructor terminal 300 (S330).

As described above, the voice recording task received from the instructor terminal 300 is stored and registered in the management server 200 (S335). The management server 200 collectively notifies the registered voice recording task to a plurality of learners belonging to the class through sending a push message by an application to the learner terminals 100.

Accordingly, when executing the application program installed in the learner terminal 100 by the learner who has confirmed the push message by an application from the management server 200, the device identifier such as an international mobile equipment identity number (IMEI) value of the learner terminal 100 is transmitted to the management server 200 (S340 and S345).

Meanwhile, the determination unit 250 of the management server 200 determines whether the device identifier received from the learner terminal 100 in the above-described step S345 and the device identifier transmitted and stored from the device identifier in the above-described step S300 are the same as each other, and if it is determined to be the same, it may be determined that the learner has attended the speaking lesson (S350).

As described above, according to the present invention, the management server 200 confirms whether the learner attends the class based on device identifier information automatically transmitted to the management server 200 in accordance with the execution of the application program, such that it is possible to immediately confirm the attendance of the learner without a separate login through an input of the learner's ID.

In addition, in implementing the present invention, the determination unit 250 of the management server 200 confirms whether the learner attends the class based on the device identifier information automatically transmitted to the management server 200 in accordance with the execution of the application program. In this case, only when a reception time of the device identifier from the learner terminal 100 is within a predetermined time (e.g., 10 minutes) from a time when the voice recording task is registered in the above-described step S335, it is also possible to admit the attendance of the learner.

As described above, when the attendance of the learner is confirmed, the determination unit 250 of the management server 200 generates attendance rate information as evaluation information for the learner, and then updates the attendance rate information according to the additional attendance confirmation of the learner and stores the same in the storage unit 230.

Meanwhile, a learner who has confirmed the voice recording task as shown in FIG. 4 by accessing the management server 200 records his or her foreign language speaking voice according to the task content through a microphone module provided in the learner terminal 100, and then transmits voice recording data to the management server 200 through the learner terminal 100 (S355).

Figures 5, 6:
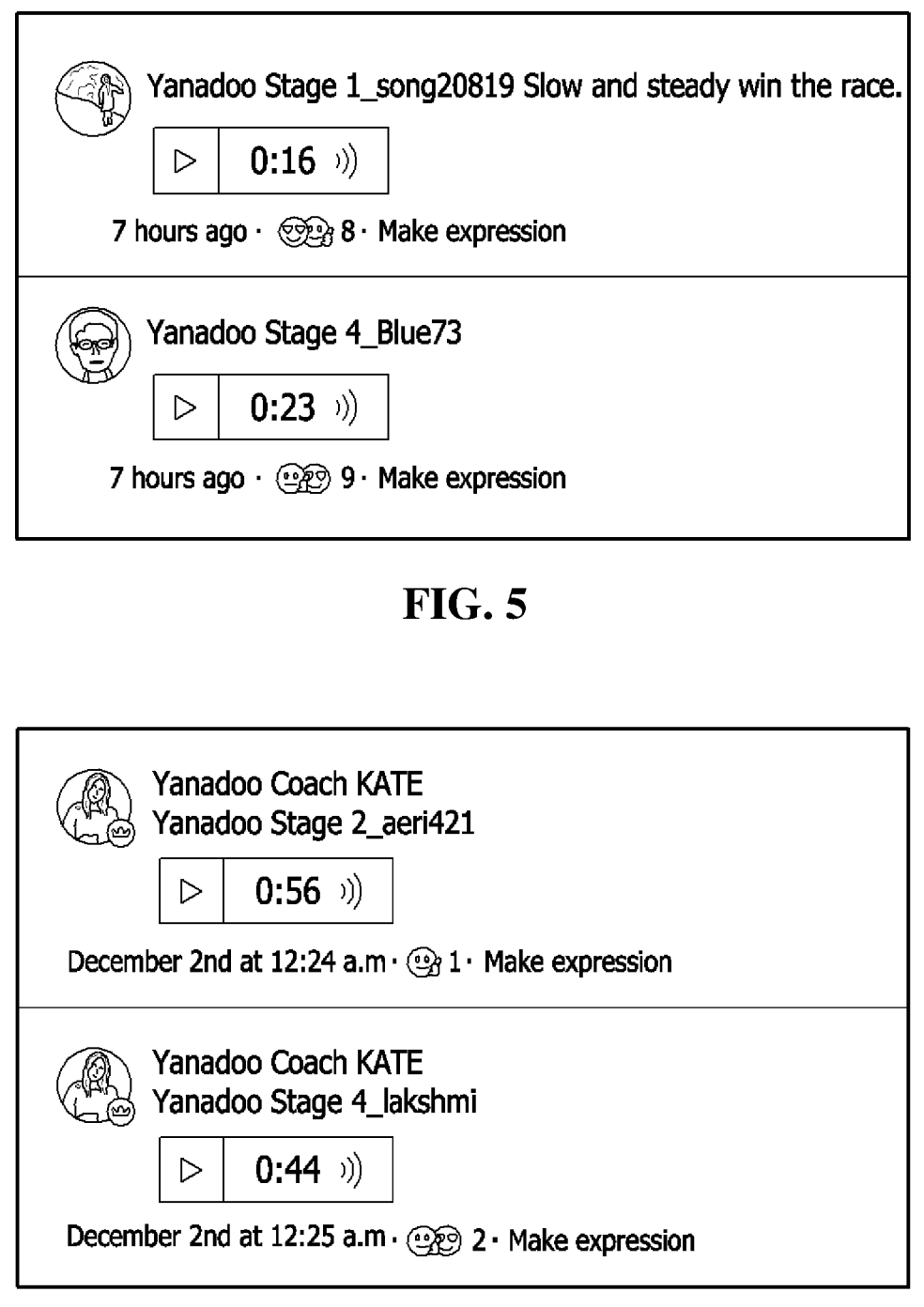

Accordingly, the management server 200 stores and registers the voice recording data received from the learner terminal 100 as a form of a comment on a voice recording task post in FIG. 4 as shown in FIG. 5 (S360).

As described above, the voice recording data of the learner registered in the form of the comment on the voice recording task post is streaming-transmitted according to transmission requests from the instructor terminal 300 accessing the management server 200 or the terminal 100 of other learners in the class.

As described above, according to the present invention, other learners can also listen to the foreign language pronunciation of the learner for a specific sentence, such that the learner may be more actively motivated in learning to speak a foreign language.

Meanwhile, an instructor who has listened to the voice recording of the learner through the instructor terminal 300 records his or her pronunciation through the microphone module provided in the instructor terminal 300 to correct an English pronunciation of the learner, thereby generating recording data for pronunciation correction by the instructor terminal 300, and the recording data for pronunciation correction generated as described above is transmitted to the management server 200 through the instructor terminal 300 (S365).

Thereby, the management server 200 stores and registers the recording data for pronunciation correction received from the instructor terminal 300 in the form of the comment on the voice recording data previously registered in the form of the comment, as shown in FIG. 6 (S360).

As described above, the recording data for pronunciation correction registered in the management server 200 is streaming-transmitted to the learner terminal 100 according to a transmission request from the learner terminal 100 accessing the management server 200 or the terminals 100 of other learners included in the class.

As described above, according to the present invention, the learner may repeatedly listen to the recording data for pronunciation correction directly recorded by the instructor for his or her foreign language pronunciation, through the learner terminal 100.

Meanwhile, the instructor who has listened to the voice recording of the learner in the above-described step S360 may input a grade for the learner determined based on the learner's pronunciation, etc. through the instructor terminal 300 (S370). Thereby, the management server 200 stores and registers the grade information received from the instructor terminal 300 as evaluation information for the learner (S375 and S380).

Meanwhile, in implementing the present invention, in addition to the above-described voice recording task, various types of subtasks may be assigned to the learner through a learner bulletin board provided through the management server 200.

Specifically, the subtask applicable in the present invention may include a task for encouraging a learner who has not performed the voice recording task among the learners belonging to the class to perform the voice recording task by tagging the learner to the voice recording task post in FIG. 4, a task for praising a learner who has performed the voice recording task by tagging the learner who has performed the voice recording task to the voice recording data registered in the form of the comment in FIG. 5, a task for entering the grade information on other learners after listening to voice recording data registered by other learners and the like.

Meanwhile, as a means for performing the subtask, a configuration of tagging a specific learner to an online post may be implemented by the same function and principle as those of the tag applied to various social network services (SNS) such as Facebook and the like.

When assigning the subtask to the learner as described above, the learner may transmit a tag request to the management server 200 through the learner terminal 100 so as to allow the learner who has not performed the voice recording task to be tagged to the voice recording task post (S385).

Thereby, the management server 200 processes the designated learner to be tagged to the post, and stores and registers the number of times requesting the tag as evaluation information for the learner based on the device identifier information of the learner terminal 100 that has transmitted the tag request.

In addition, in order to perform an additional task, the learner may transmit a tag request to the management server 200 through his or her learner terminal 100 so as to allow the learner who has performed the voice recording task to be tagged to the voice recording data (S390).

Thereby, the management server 200 processes the designated learner to be tagged to the voice recording data, and stores and registers the number of times requesting the tag as evaluation information for the learner based on the device identifier information of the learner terminal 100 that has transmitted the tag request.

Further, in order to perform an additional subtask, the learner may listen to voice recording data registered by other learners and then input grade information on other learners through his or her learner terminal 100. Thereby, the management server 200 receives the grade information on other learners from the learner terminal 100 (S391).

Thereby, the management server 200 stores and registers the grade information as the evaluation information on other learners, and saves and registers the number of times assigning the grade to other learners as evaluation information on learners who have assigned the grades to other learners.

Meanwhile, the determination unit 250 of the management server 200 determines whether a reward to the learner is performed based on the attendance rate of the learner in the above-described step S350, the grade of the instructor for the learner in the above-described step S380, the number of times requesting the tag in the aforementioned S385 and S390 steps, the number of times assigning the grade to other learners in step S390, and the grade assigned from the other learners (S393).

In implementing the present invention, the reward for the learner may be a course discount voucher, a premium payment, or the like, and the management server 200 may determine whether the reward is performed based on only any one of the above-described evaluation information in step S393 according to whether the evaluation information exceeds a predetermined reward reference value, and may determine whether the reward is performed according to whether a sum of two or more evaluation information of the above-described evaluation information or an average value thereof exceeds the predetermined reward reference value.

Meanwhile, when the determination unit 250 of the management server 200 determines a reward for a specific learner, the management server 200 transmits a reward guide message to the learner terminal 100 (S395).

In addition, the determination unit 250 of the management server 200 may also determine whether the class course of the learner is completed based on the attendance rate of the learner in the above-described step S350, the grade of the instructor for the learner in the above-described step S380, and the grade assigned from other learners in the above-described step S390 (S397).

Specifically, the management server 200 may determine that the learner has completed the class course when the attendance rate of the learner in the above-described step S350 exceeds a predetermined completion reference value (e.g., 80%).

In addition, in implementing the present invention, even when the attendance rate of the learner exceeds the predetermined completion reference value, the determination unit 250 of the management server 200 may determine that the learner has completed the class course, only when calculating an average value of the grades of the instructor for the learner in the above-described step S380 and the grades assigned from other learners in the above-described S390 step, and then the calculated average value exceeds a predetermined completion reference value (e.g., 70 points).

Meanwhile, in implementing the present invention, in order for the learner to take a class course of the next level, it is preferable that the learners are motivated to participate in the class by allowing the learners to take the class only when they have completed the class course of the previous level.

Meanwhile, when it is determined that the learner has completed the class course by the determination unit 250 of the management server 200, the management server 200 transmits a message for providing guidance regarding the next level class course that can be taken by the learner to the learner terminal 100 (S399).

In addition, the terminology used herein is for the purpose of describing particular embodiments only and is not intended to limit the present invention thereto. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

While the present invention has been described with reference to the preferred embodiments and modified examples, the present invention is not limited to the above-described specific embodiments and the modified examples, and it will be understood by those skilled in the related art that various modifications and variations may be made therein without departing from the scope of the present invention as defined by the appended claims, as well as these modifications and variations should not be understood separately from the technical spirit and prospect of the present invention.

INDUSTRIAL APPLICABILITY

The present invention may be applied to foreign language education through online, such that industrial applicability thereof may be recognized in the industrial fields of the foreign language education through online.

The invention claimed is:

1. A method for managing a language speaking lesson on a network comprising:

receiving, by a management server, a request for registering a voice recording task of a learner, from an instructor terminal;

determining, by the management server, whether the learner attends a class based on device identifier information of a terminal of the learner when a device identifier from the terminal of the learner is received within a predetermined time from when the voice recording task of the learner is registered;

receiving, by the management server, voice recording data from the terminal of the learner who has confirmed the voice recording task;

receiving, by the management server, recording data for pronunciation correction of the voice recording data, from the instructor terminal;

receiving, by the management server, a request for a tag that a learner who has not performed the voice recording task be tagged, from the terminal of the learner; and processing, by the management server, for the learner who has not performed the voice recording task to be tagged to a voice recording task post, and storing a number of times requesting the tag as evaluation information for the learner that has transmitted the request for the tag, based on the device identifier information of the terminal of the learner.

2. The method for managing the language speaking lesson on the network according to claim 1, further comprising receiving, by the management server, grade information on other learners who have performed the voice recording task, from the terminal of the learner.

3. A management server comprising at least one processor configured to:

receive a request for registering a voice recording task of a learner, from an instructor terminal;

determine whether the learner attends a class based on device identifier information of a terminal of the learner when a device identifier from the terminal of the learner is received within a predetermined time from when the voice recording task of the learner is registered;

receive voice recording data from the terminal of the learner who has confirmed the voice recording task;

receive recording data for pronunciation correction of the voice recording data, from the instructor terminal;

receive a request for a tag that a learner who has not performed the voice recording task be tagged, from the terminal of the learner; and process for the learner who has not performed the voice recording task to be tagged to a voice recording task post, and store a number of times requesting the tag as evaluation information for the learner that has transmitted the request for the tag, based on the device identifier information of the terminal of the learner.

4. The management server according to claim 3, wherein the at least one processor is further configured to receive grade information on other learners who have performed the voice recording task, from the terminal of the learner.

* * * * *